(12) United States Patent
Wakabayashi et al.

(10) Patent No.: US 8,684,148 B2
(45) Date of Patent: Apr. 1, 2014

(54) DISC BRAKE

(75) Inventors: Nobuhiro Wakabayashi, Minami-ALPS (JP); Shigeru Hayashi, Minami-ALPS (JP)

(73) Assignee: Hitachi Automotive Sysetms, Ltd., Ibaraki (JP)

( * ) Notice: Subject to any disclaimer, the term of this patent is extended or adjusted under 35 U.S.C. 154(b) by 208 days.

(21) Appl. No.: 13/496,972

(22) PCT Filed: Sep. 27, 2010

(86) PCT No.: PCT/JP2010/066711
§ 371 (c)(1),
(2), (4) Date: Mar. 19, 2012

(87) PCT Pub. No.: WO2011/037232
PCT Pub. Date: Mar. 31, 2011

(65) Prior Publication Data
US 2012/0186918 A1     Jul. 26, 2012

(30) Foreign Application Priority Data

Sep. 28, 2009   (JP) .................................. 2009-222773
Sep. 15, 2010   (JP) .................................. 2010-207292

(51) Int. Cl.
*F16D 55/22*        (2006.01)
(52) U.S. Cl.
CPC ..................................... *F16D 55/22* (2013.01)
USPC ..................................... 188/73.36; 188/73.38
(58) Field of Classification Search
CPC .................................................. F16D 55/226
USPC .......................................... 188/73.36–73.38
See application file for complete search history.

(56) References Cited

U.S. PATENT DOCUMENTS 4,219,105 A  *  8/1980  Delaunay ................... 188/73.38
6,223,866 B1 *  5/2001  Giacomazza .............. 188/73.38

(Continued)

FOREIGN PATENT DOCUMENTS

| EP | 1 717 476 | 11/2006 |
|----|-----------|---------|
| JP | 63-18635  | 2/1988  |

(Continued)

OTHER PUBLICATIONS

International Search Report issued Nov. 30, 2010 in International (PCT) Application No. PCT/JP2010/066711.

*Primary Examiner* — Christopher Schwartz
(74) *Attorney, Agent, or Firm* — Wenderoth, Lind & Ponack, LLP

(57) ABSTRACT

Provided is a disc brake capable of preventing large positional shift of a position of abutment of a return spring against a mounting member, which occurs with wear of a friction pad and the like. The return spring for biasing the friction pad in a direction away from a disc includes a fixed portion on one side, which is fixedly mounted to the friction pad, an extending portion extending from the fixed portion in an axial direction of the disc and in a direction away from the friction pad, a turned-back portion formed by turning back a distal end side of the extending portion toward the mounting member, and an abutting portion provided on a distal end side of the turned-back portion so as to be elastically brought into abutment against a side of the mounting member. A portion (bent portion) of the turned-back portion, which is formed by bending the turned-back portion at the middle thereof, is located at a position separated farther away from the fixed portion than the abutting portion in a disc rotating direction.

17 Claims, 12 Drawing Sheets

(56) References Cited

U.S. PATENT DOCUMENTS

| | | |
|---|---|---|
| 6,527,090 B1 * | 3/2003 | Barillot et al. ............. 188/73.38 |
| 2004/0104086 A1 * | 6/2004 | Katoh ......................... 188/73.38 |
| 2004/0195057 A1 | 10/2004 | Ooshima et al. |
| 2005/0194222 A1 * | 9/2005 | Stickney et al. ........... 188/73.38 |
| 2006/0237269 A1 | 10/2006 | Farooq |

FOREIGN PATENT DOCUMENTS

| | | |
|---|---|---|
| JP | 8-42608 | 2/1996 |
| JP | 2004-308789 | 11/2004 |
| JP | 2006-308092 | 11/2006 |
| JP | 2009-41769 | 2/2009 |

* cited by examiner

DISC BRAKE

TECHNICAL FIELD

The present invention relates to a disc brake which applies a braking force to, for example, a vehicle such as an automobile.

BACKGROUND ART

In general, a disc brake provided to a vehicle such as an automobile slides and displaces a piston provided to a caliper toward a disc by supplying a hydraulic pressure from exterior to press friction pads against the disc when a driver of the vehicle or the like performs a braking operation. Then, the caliper slides and displaces relative to a carrier by a counterforce generated at this time to press the friction pads against both surfaces of the disc between a claw portion and the piston, thereby applying a braking force to the rotating disc.

Further, there is known a disc brake which includes return springs for biasing the friction pads in a direction in which the friction pads move away from both surfaces of the disc when the braking operation of the vehicle is released. The return springs are provided between the carrier and the friction pads and bias the frictions pads in a return, direction in which the friction pads move away from the disc (for example, see Patent Literature 1).

CITATION LIST

Patent Literature

PTL 1: JP 2004-308789 A

SUMMARY OF INVENTION

Technical Problem

The return spring used in the aforementioned related art has a configuration in which a middle portion between a fixed portion on one side, which is fixedly mounted to a back metal of the friction pad, and an abutting portion on the other side, which is brought into abutment against (elastic contact with) an arm portion side of a mounting member is formed to be bent in an inverted V shape or inverted U shape.

Therefore, when the friction pads are worn away through repetition of the braking operation, the amount of deformation of the return springs used in the related art becomes large with the wear. As a result, the position of abutment of each of the return springs with respect to the side of the mounting member is shifted in a direction away from the friction pads. An area of abutment of the return spring is required to be set large in view of the positional shift. Thus, there is a problem in that the size of the carrier is disadvantageously increased, which in turn results in increased size of the disc brake.

Solution to Problem

In order to solve the above-mentioned problem, according to an exemplary embodiment of the present invention, a return spring includes: a fixed portion fixed to a friction pad; an abutting portion to be brought into abutment against a side of a mounting member; an extending portion extending from the fixed portion in a disc axial direction and a direction away from the friction pad; and a turned-back portion turned back from the extending portion toward the abutting portion. The turned-back portion includes one extension portion extending, from a position separated farther away from the fixed portion than the abutting portion in a disc rotating direction, in the disc axial direction and a direction closer to the mounting member so as to be connected to the abutting portion.

Further, in order to solve the above-mentioned problem, according to another exemplary embodiment of the present invention, a return spring includes: a fixed portion provided on one end side, fixed onto a plane of a friction pad on a side opposite to a disc abutting surface; an abutting portion provided on another end side, to be brought into elastic abutment against a side of a mounting member; an extending portion extending from the fixed portion in a disc axial direction and in a direction away from the friction pad; and a turned-back portion formed between a distal end side of the extending portion and the abutting portion, and turned back toward the mounting member. The turned-back portion includes: a first extension portion extending from a distal end side of the extending portion in a direction along the plane of the friction pad and in a direction away from the fixed portion to a position beyond the abutting portion; and a second extension portion obliquely turned back from a distal end side of the first extension portion toward the mounting member in the disc axial direction so as to be connected to the abutting portion.

Further, in order to solve the above-mentioned problem, according to still another exemplary embodiment of the present invention, a disc brake includes a return spring for biasing a friction pad in a return direction in which the friction pad moves away from a disc, the return spring including: a fixed portion fixed to the friction pad; an abutting portion to be brought into abutment against a side of a mounting member; an extending portion extending from the fixed portion in a disc axial direction and in a direction away from the friction pad; and a turned-back portion turned back from the extending portion toward the abutting portion. The turned-back portion of the return spring includes at least two bent portions formed in a direction along a disc abutting surface of the friction pad. A bending stiffness of one bent portion of the at least two bent portions, which is on a side of the friction pad, is set lower than a bending stiffness of another bent portion thereof on the side of the mounting member.

DESCRIPTION OF EMBODIMENTS

Hereinafter, a disc brake according to embodiments of the present invention is described in detail with reference to the accompanying drawings.

First Embodiment

Figure 1:
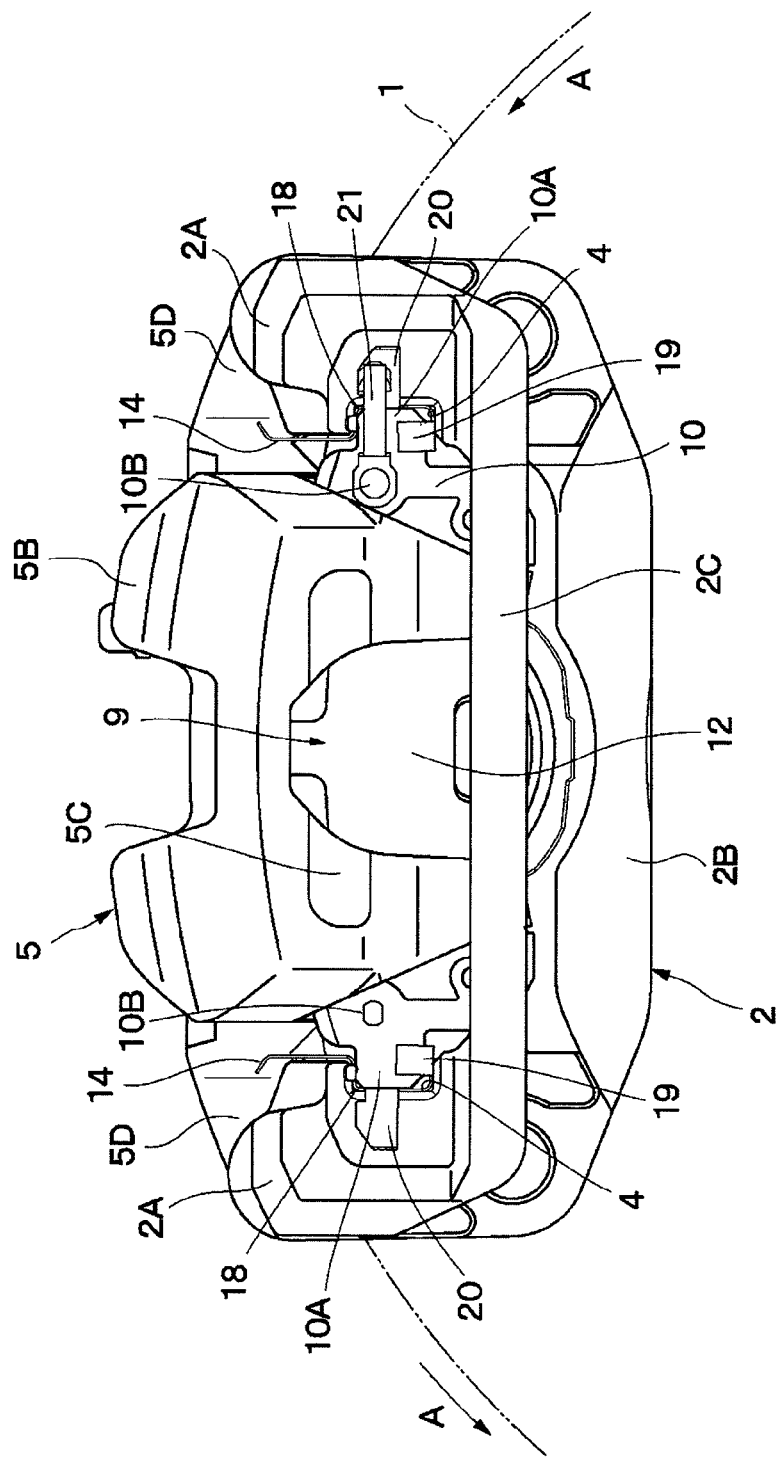
FIG. 1 is a front view illustrating a disc brake according to an embodiment of the present invention, as viewed from the outer side.
Figure 2:
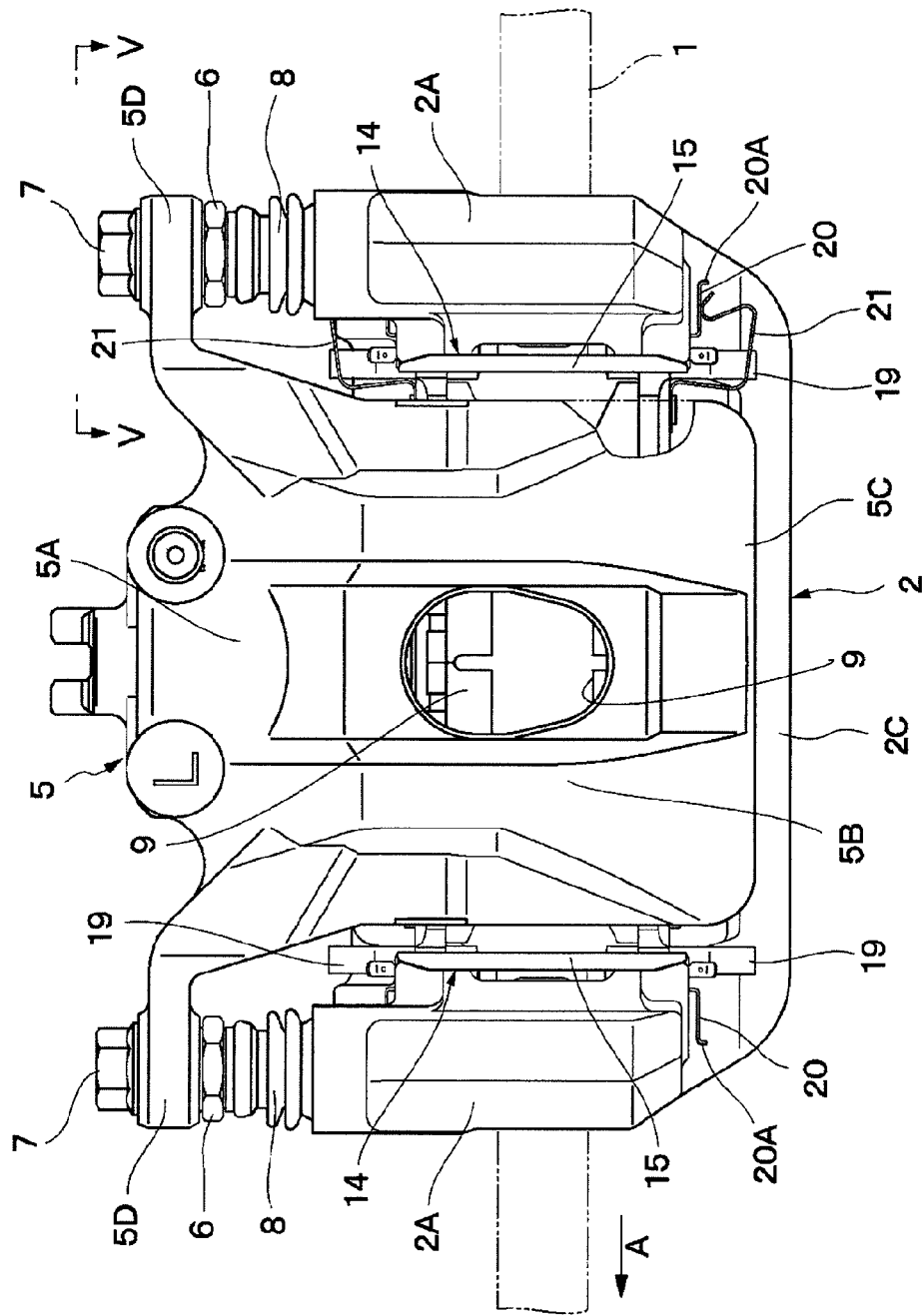
FIG. 2 is a plan view illustrating the disc brake illustrated in FIG. 1, as viewed from above.
Figure 3:
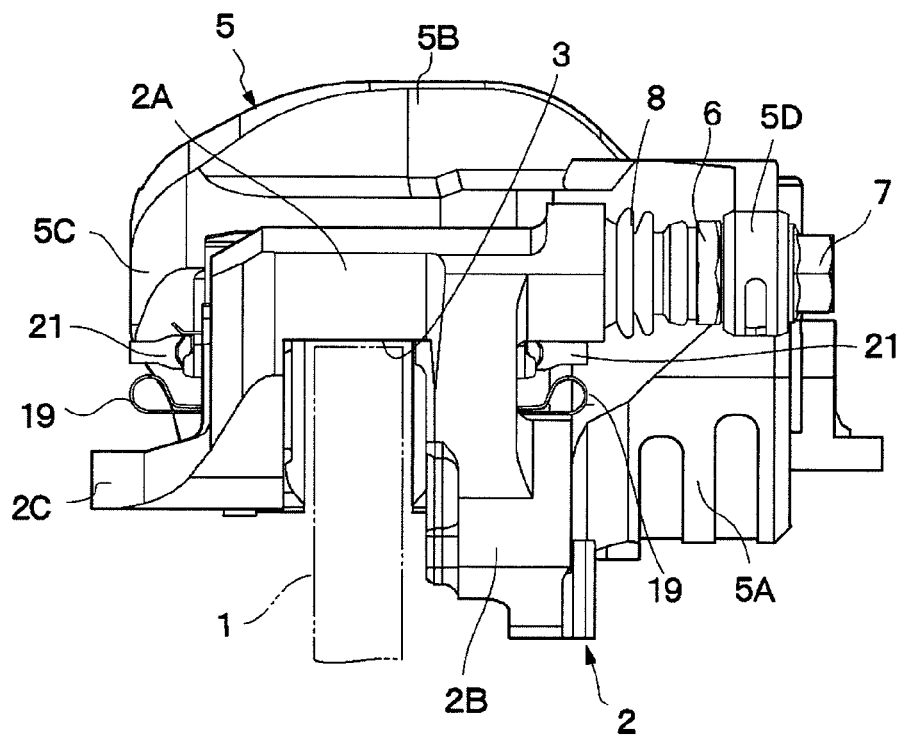
FIG. 3 is a right side view illustrating the disc brake illustrated in FIG. 1, as viewed from the right direction.

FIGS. 1 to 8 illustrate a first embodiment of the present invention. In FIGS. 1 to 3, a disc 1 rotates with a wheel (not shown) in a direction A indicated by an arrow in FIG. 1 when, for example, a vehicle runs forward. In the following description, a side of a carrier 2 from which the disc 1 enters while rotating (right side in FIG. 1) is referred to as a rotating entrance side, whereas a side of the carrier 2 from which the disc 1 exits while rotating (left side in FIG. 1) is referred to as a rotating exit side.

The carrier 2 is mounted to a non-rotating portion of the vehicle as a mounting member. As illustrated in FIGS. 1 to 3, the carrier 2 includes a pair of arm portions 2A, 2A provided so as to be separated from each other in a rotating direction (circumferential direction) of the disc 1, the pair of arm portions 2A, 2A extending in an axial direction of the disc 1 so as to extend over an outer circumference of the disc 1, and a bearing portion 2B having a large thickness, which is provided so as to connect base end sides of the arm portions 2A into one and is fixed to the non-rotating portion of the vehicle at a position on an inner side of the disc 1.

A reinforcing beam 2C for connecting distal end sides of the arm portions 2A, 2A at positions on an outer side of the disc 1 is formed integrally with the carrier 2 as illustrated in FIGS. 1 and 2.

In a middle portion of each of the arm portions 2A in the axial direction of the disc 1, a disc path portion 3 extending in an arc-like shape along an outer circumference (locus of rotation) of the disc 1 is formed as illustrated in FIG. 3. On both sides of the disc path portion 3 in the axial direction of the disc 1, pad guides 4 on the inner side and the outer side are respectively formed. A pin hole (not shown) is provided to each of the arm portions 2A along the axial direction of the disc 1. A sliding pin 6 described below is slidably fitted into each of the pin holes.

Figure 4:
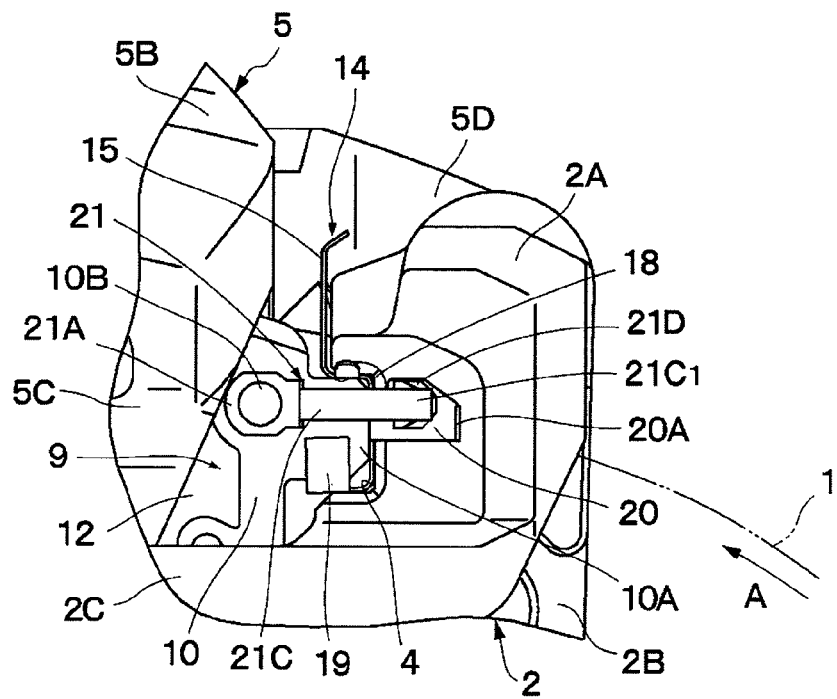
FIG. 4: is a partially enlarged view illustrating a return spring and the like illustrated in FIG. 1 in an enlarged manner.
Figure 5:
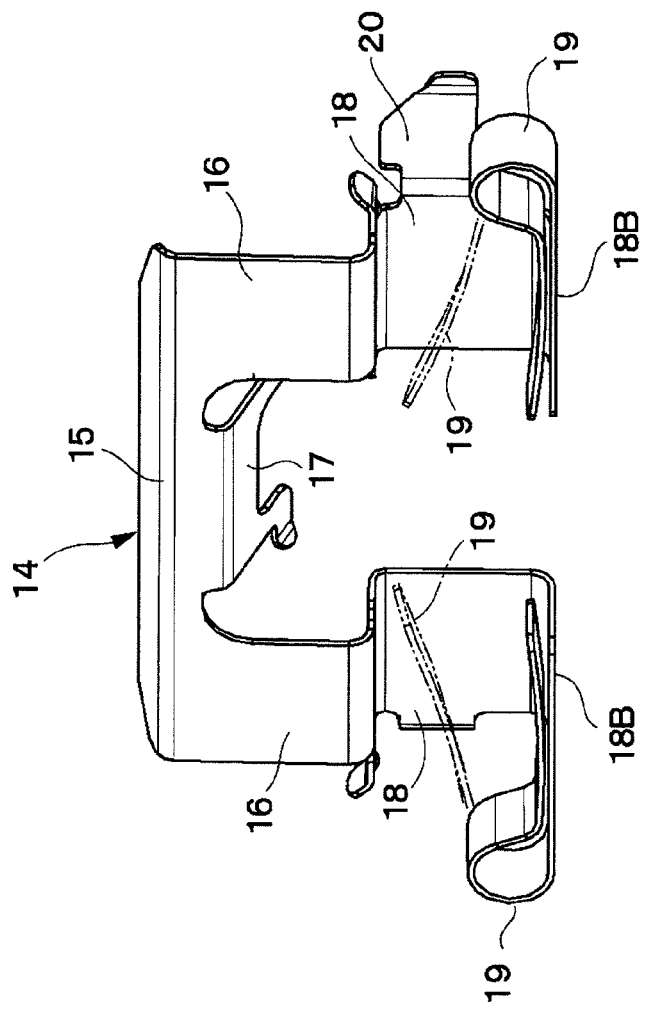
FIG. 5 is a perspective view illustrating a pad spring alone.

The pad guides 4, 4, . . . are provided to each of the arm portions 2A of the carrier 2 on the base end side (inner side) and the distal end side (outer side) of each of the arm portions 2A so as to be located on both sides of the disc path portion 3 in the axial direction to interpose the disc path portion 3 therebetween. Each of the pad guides 4 is formed as a concave groove extending in the axial direction of the disc 1 to form a squared C-like cross section as illustrated in FIGS. 1, 4, and 5.

Moreover, the pad guides 4 also serve as torque-receiving portions for receiving a braking torque applied to friction pads 9 described below from the disc 1 when a braking operation is performed.

A caliper 5 is slidably provided to the carrier 2. As illustrated in FIGS. 1 to 3, the caliper 5 includes an inner leg portion 5A provided on one side (inner side) of the disc 1, a bridge portion 5B provided so as to extend from the inner leg portion 5A to the other side (outer side) of the disc 1 between the arm portions 2A of the carrier 2 so as to extend over the outer circumferential side of the disc 1, and an outer leg portion 5C having a plurality of claw portions on the distal end side, which extends inward in a radial direction of the disc 1 from the distal end side (outer side) of the bridge portion 5B.

A cylinder into which a piston is slidably fitted (both not shown) is provided to the inner leg portion 5A of the caliper 5. A pair of mounting portions 5D, 5D respectively projecting in right and left directions in FIGS. 1 and 2 are provided to the inner leg portion 5A. The mounting portions 5D constitute support arms for allowing the arm portions 2A of the carrier 2 to slidably support the caliper 5 through an intermediation of the sliding pins 6. A protective boot 8 for covering the periphery of a base end side of the sliding pin 6 to prevent rain water or the like from entering between the sliding pin 6 and the pin hole of the arm portion 2A is mounted between the sliding pin 6 and each of the arm portions 2A.

Friction pads 9, 9 on the inner side and the outer side are provided so as to be respectively opposed to both surfaces of the disc 1. As illustrated in FIGS. 1, 2, 4, and 6, each of the friction pads 9 includes a flat-plate like back metal 10 extending in the circumferential direction (rotating direction) of the disc 1, a lining 11 (see FIG. 6) serving as a friction member which is fixedly provided on a surface side of the back metal 10 and comes into frictional contact with the surface of the disc 1, and the like.

Each of the back metals 10 of the friction pads 9 is formed from a flat plate material having a fan-like shape as a whole. On both end sides thereof in a length direction (circumferential direction of the disc 1), ear portions 10A, 10A serving as fitting portions are provided so that each ear portion 10A forms a convex shape. The ear portions 10A of the back metal 10 are respectively slidably fitted into the pad guides 4 of the carrier 2 through an intermediation of guide plate portions 18 of pad springs 14 described below. The friction pads 9 on the inner side and the outer side are pressed against both surfaces of the disc 1 by the caliper 5 when the braking operation is performed. At this time, the ear portions 10A of the back metals 10 slide and displace in the axial direction of the disc 1 along the pad guides 4.

A radial-direction biasing portion 19 of the pad spring 14 described below elastically abuts against each of the ear portions 10A of the friction pads 9 (back metals 10). As a result, the friction pads 9 are constantly biased outward in the radial direction of the disc 1. Right and left caulking portions 10B, 10B are provided to the back metal 10 of the friction pad 9 so as to be positioned close to the base end (bottom) sides of the ear portions 10A.

Meanwhile, the ear portion 10A of the ear portions 10A of the friction pads 9 (back metals 10), which is located on the rotating exit side of the disc 1, continues to abut against the arm portion 2A (bottom portion of the pad guide 4) on the rotating exit side of the carrier 2 through an intermediation of the guide plate portion 18 of the pad spring 14 by a braking torque (rotation torque in the direction A indicated by the arrow in FIG. 1) received from the disc 1 by the friction pads 9 at the time of, for example, the braking operation of the vehicle. Between the abutting surfaces of the ear portion and the arm portion, the braking torque generated at the time of the braking operation is received by the carrier 2.

A shim plate 12 for preventing squeal is removably provided to the friction pad 9 on the outer side, illustrated in FIGS. 1 and 4, on a rear surface side of the back metal 10. A shim plate (not shown) for preventing squeal is removably provided to the friction pad 9 on the inner side, illustrated in FIG. 2, on the rear surface side of the back metal 10.

The pad springs 14, 14 are respectively provided between the arm portions 2A of the carrier 2 and the friction pads 9, and are respectively mounted to the arm portions 2A of the carrier 2. The pad springs 14, 14 elastically support the fiction pads 9 on the inner side and the outer side therebetween and smooth the sliding displacement of the friction pads 9. As illustrated in FIGS. 1, 2, 4, and 5, each of the pad springs 14 is integrally formed by punching out a stainless steel plate having a spring property and then bending the punched-out stainless steel plate by using means such as press working. By the processes described above, a connection plate portion 15, the guide plate portions 18, 18, the radial-direction biasing portions 19, 19, and seating-surface plate portions 20, 20 are provided to the pad spring 14.

The connection plate portion 15 connects the guide plate portions 18 of the pad spring 14 or the like to each other. The connection plate portion 15 is formed so as to extend in the axial direction so as to extend over the outer circumferential side of the disc 1. On the both end sides in the length direction thereof, a pair of flat plate portions 16, 16 are integrally formed so as to extend inward in the radial direction of the disc 1. An engagement plate portion 17 is located between the pair of flat plate portions 16, 16 and is integrally formed with the connection plate portion 15. The engagement plate portion 17 is mounted to the carrier 2 so as to be brought into engagement with the disc path portion 3 of the arm portion 2A from the radially inner side. In this manner, the pad spring 14 is positioned in the axial direction of the disc 1 with respect to the arm portion 2A of the carrier 2.

The guide plate portions 18, 18 are provided on both end sides of the connection plate portion 15 through an intermediation of the flat plate portions 16. Each of the guide plate portions 18 is formed by bending from the distal end side of the flat plate portion 16 into an approximate squared C shape. One guide plate portion 18 of the guide plate portions 18, 18 is mounted by being fitted into the pad guide 4 on the outer side, as illustrated in FIG. 4, whereas another guide plate portion 18 is mounted by being fitted into the pad guide 4 on the inner side. The guide plate portion 18 includes an upper surface plate 18A and a lower surface plate 18B respectively opposed to upper and lower wall surfaces of the pad guide 4, and a guide bottom plate 18C which connects the upper surface plate 18A and the lower surface plate 18B in the radial direction of the disc 1 and forms a flat surface shape to extend in the axial direction of the disc 1 so as to be brought into abutment against a rear-side wall surface (bottom portion) of the pad guide 4.

The radial-direction biasing portions 19, 19 bias the friction pads 9, 9 outward in the radial direction of the disc 1. Each of the radial-direction biasing portions 19 is formed by being bent outward in the radial direction of the disc 1 in an approximate U shape or an approximate C shape at a position at which the radial-direction biasing portion extends from the lower surface plate 18B of the guide plate portion 18 outward in the axial direction of the disc 1. The radial-direction biasing portion 19 elastically biases the ear portion 10A of the friction pad 9 outward in the radial direction of the disc 1 so as to prevent the friction pad 9 from clattering.

Figure 8:
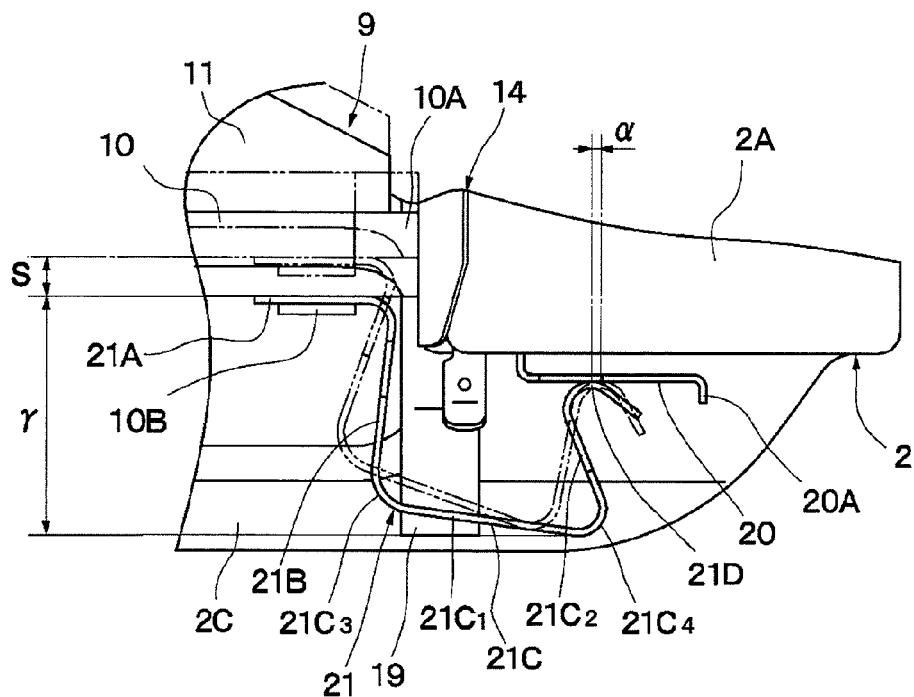
FIG. 8 is an enlarged view of a principal part, illustrating a state in which the return spring illustrated in FIG. 2 is elastically deformed by wear of the friction pad.

The seating-surface plate portions 20, 20 are integrally formed by bending the base end sides thereof into an L shape so as to be vertical to the guide bottom plates 18C of the guide plate portions 18 as illustrated in FIGS. 4 and 5. The distal end sides of the seating-surface plate portions 20 are free ends extending outward in the circumferential direction of the disc 1 (outward in the right and left directions) so as to be slightly separated away from the arm portions 2A of the carrier 2 as illustrated in FIGS. 1, 2, and 8. The free end side of the seating-surface plate portion 20 is formed into a flat-plate shape having a larger width than that of a return spring 21 described below, as illustrated in FIG. 4, and provides a receiving seating surface when the return spring 21 is brought into abutment in an elastically deformed state. On the distal end side of the seating-surface plate portion 20, a bent piece portion 20A bent outward in the axial direction of the disc 1 in an L shape is provided as exemplarily illustrated in FIG. 2.

The return springs 21, 21 are provided between the arm portion 2A located on the rotating entrance side (on the entrance side in the rotating direction, that is, the rotating entrance side) of the disc 1 which rotates in the direction A indicated by the arrow and the friction pads 9 so as to bias the friction pads 9 on the inner side and the outer side in a return direction in which the friction pads move away from the disc 1 as illustrated in FIGS. 1, 2, and 4. As illustrated in FIG. 8, one side of each of the return springs 21 in the length direction is mounted to the back plate 10 of each of the friction pads 9, whereas the other side in the length direction is brought into abutment against the carrier 2 side (the seating-surface plate portion 20 of the pad spring 14) in an elastically deformed state. The return spring 21 includes a fixed portion 21A, an extending portion 21B, a turned-back portion 21C, and an abutting portion 21D, as illustrated in FIGS. 4, and 6 to 8.

Figure 6:
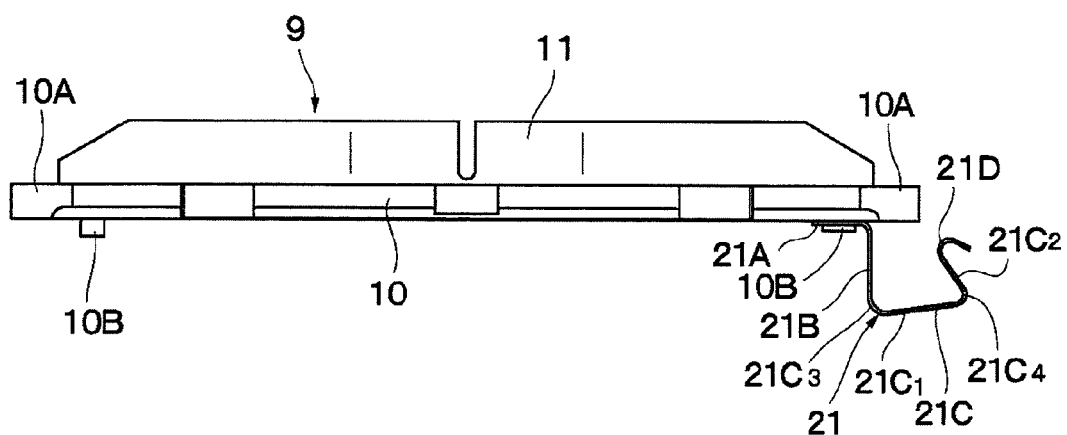
FIG. 6 is a plan view illustrating a state in which the return spring on the outer side is mounted to a friction pad on the outer side.
Figure 7:
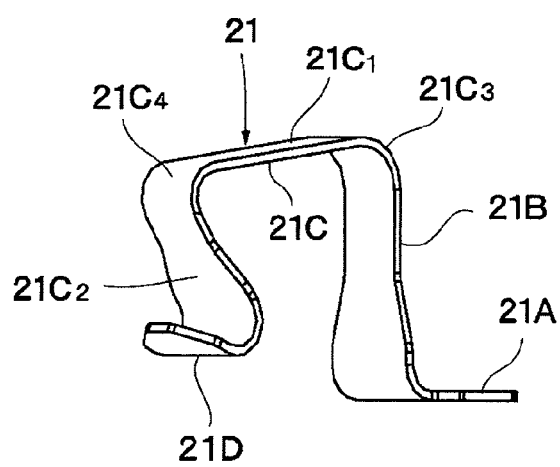
FIG. 7 is a perspective view of the return spring.

The fixed portion 21A is located on one side of the return spring 21 in the length direction, formed into a flat plate shape, and fixed to the friction pad 9 (back metal 10) on the ear portion 10A side by the caulking portion 10B. The extending portion 21B is provided so as to be bent from the fixed portion 21A into an L shape as illustrated in FIGS. 6 to 8 so that a distal end side extends in the axial direction of the disc 1, corresponding to a direction in which the distal end side vertically moves away from the surface of the disc 1. The extending portion 21B is not necessarily required to be bent into the L shape so that the distal end side extends in the axial direction of the disc 1, corresponding to the direction in which the distal end side vertically moves away from the surface of the disc 1, and can be extended with an angle with respect to the axial direction of the disc 1 as needed.

The turned-back portion 21C is formed by bending a distal end side of the extending portion 21B toward the carrier 2, that is, toward the seating-surface plate portion 20 of the pad spring 14. The abutting portion 21D is located on the other side of the return spring 21 in the length direction in continuity with the turned-back portion 21C and is formed by being bent into an approximate U shape. The turned-back area of the abutting portion 21D, that is, the area bent into the U shape so as to be rounded off, elastically abuts against the seating-surface plate portion 20 of the pad spring 14. The return spring 21 biases the friction pad 9 in a direction away from the disc 1, based on the abutting area as a base point.

The turned-back portion 21C of the return spring 21 includes a first extension portion 21C1 extending from the distal end side of the extending portion 21B in a direction along a plane of the friction pad 9 (back metal 10) (disc rotating direction) away from the fixed portion 21A, and a second extension portion 21C2 bent from the distal end side of the first extension portion 21C1 toward the carrier 2 (toward the seating-surface plate portion 20 of the pad spring 14) so as to be smoothly connected to the abutting portion 21D.

The turned-back portion 21C includes a first bent portion 21C3 which is formed into a curved approximate L shape between the extending portion 21B and the first extension portion 21C1 of the turned-back portion 21C and a second bent portion 21C4 between the first extension portion 21C1 and the second extension portion 21C2, which corresponds to a middle portion of the turned-back portion 21C. The second bent portion 21C4 is located at a position which is separated farther away from the fixed portion 21A than the abutting portion 21D in the direction along the plane of the friction pad 9 (back metal 10), that is, the disc rotating direction. The second extension portion 21C2 of the turned-back portion 21C is formed so as to be turned back from the distal end side of the first extension portion 21C1 (at the position of the second bent portion 21C4) to extend in the direction along the plane of the back metal 10, that is, the disc rotating direction and in a direction closer to the fixed portion 21A. Specifically, an angle formed between the first extension portion 21C1 and the second extension portion 21C2 (hereinafter, referred to as "angle of the second bent portion 21C4" for convenience) is an acute angle and is smaller than an acute angle formed between the extending portion 21B and the first extension portion 21C1 (hereinafter, referred to as "angle of the first bent portion 21C3" for convenience). As described above, the turned-back portion 21C of the return spring 21 extends in a direction in which the turned-back portion passes over the pad guide 4, the seating-surface plate portions 20 of the pad spring 14, which are located on the rotating entrance side of the disc 1, and the like, as illustrated in FIG. 4 (outward in the horizontal direction in FIG. 4).

The first extension portion 21C1 is configured as another extension portion, whereas the second extension portion 21C2 is configured as one extension portion. The first bent portion 21C3 is configured as one bent portion, whereas the second bent portion 21C4 is configured as another bent portion. When the extending portion 21B extends vertically from the surface of the disc 1, the angle of the first bent portion 21C3 and the angle of the second bent portion 21C4 are not required to be both acute as described above as long as the second extension portion 21C2 extends in the disc rotating direction and in the direction closer to the fixed portion 21A. For example, when the angle of the first bent portion 21C3 is acute, the angle of the second bent portion 21C4 can be set to be right or obtuse. When the angle of the first bent portion 21C3 is right or obtuse, the angle of the second bent portion 21C4 can be set to be acute. In any of the cases, the angles are set so as to satisfy the following Formula 1.

(90°−angle of first bent portion 21C3)>(angle of second bent portion) 21C4−90°  [Formula 1]

The return spring 21 constantly biases the friction pad 9 (back metal 10) by the abutment or sliding contact of the abutting portion 21D located on the distal end side thereof (on the other side in the length direction) against/with the surface of the seating-surface plate portion 20 in the elastically deformed state so as to stably return the friction pad 9 to a standby position which is separated away from the disc 1 when, for example, the braking operation of the vehicle is released.

The disc brake according to this embodiment has the configuration described above. Next, an operation thereof is described.

First, when the braking operation of the vehicle is performed, a brake fluid pressure is supplied to the inner leg portion 5A (cylinder) of the caliper 5 to slide and displace the piston toward the disc 1. In this manner, the friction pad 9 on the inner side is pressed against one side surface of the disc 1. At this time, the caliper 5 is subjected to a counterforce from the disc 1, which is generated by pressing. Therefore, the entire caliper 5 slides and displaces toward the inner side with respect to the arm portion 2A of the carrier 2. Then, the outer leg portion 5C presses the friction pad 9 on the outer side against the other side surface of the disc 1 (see a stroke S illustrated in FIG. 8).

As a result, the friction pads 9 on the inner side and the outer side can interpose the disc 1 rotating in the direction A indicated by the arrow in FIGS. 1 to 4 therebetween from both sides in the axial direction so as to apply a braking force to the disc 1. Then, when the braking operation is released, the supply of the hydraulic pressure to the piston is stopped to separate the friction pads 9 on the inner side and the outer side away from the disc 1 so that the friction pads return to a non-braking state.

When the braking operation is performed and released (the braking operation is not performed) as described above, the right and left ear portions 10A of the back metal 10 of the friction pad 9 are biased outward in the radial direction of the disc 1 by the radial-direction biasing portions 19 of the respective pad springs 14. Therefore, each of the ear portions 10A of the back metal 10 is pressed so as to be brought into sliding contact with the upper side wall surface of the pad guide 4 of each of the arm portions 2A of the carrier 2 through the guide plate portion 18 of the pad spring 14 (upper surface plate 18A). As a result, the clattering of the friction pads 9 in the radial direction and the rotating direction or the circumferential direction of the disc 1 due to vibrations or the like generated while the vehicle is running can be restrained by an elastic force (biasing force) of the radial-direction biasing portions 19 provided to the pad spring 14. When the braking operation is performed, the friction pads 9 are subjected to the braking torque (rotation torque in the direction A indicated by the arrow) from the disc 1. At this time, the ear portion 10A on the rotating exit side is continuously held in abutment against the pad guides 4 (torque-receiving portions) of the carrier 2 through an intermediation of the guide bottom plates 18C of the guide plate portions 18 of the pad spring 14. Thus, the braking torque generated during the braking operation can be received by the arm portion 2A (torque-receiving portion) on the rotating exit side.

When the braking operation is performed, each of the ear portions 10A of the friction pad 9 can be held in sliding contact with the upper side wall surfaces of the pad guides 4 through an intermediation of the upper surface plates 18A of the guide plate portions 18 of the pad spring 14 by the radial-direction biasing portions 19 of each of the pad springs 14. Besides, the friction pads 9 on the inner side and the outer side can be smoothly guided in the axial direction of the disc 1 along the guide plate portions 18.

In this embodiment, the return spring 21 on the inner side is formed as an integral member including the fixed portion 21A, the extending portion 21B, the turned-back portion 21C, and the abutting portion 21D by bending the metal plate having the spring property. The second bent portion 21C4 corresponding to the middle portion of the turned-back portion 21C is configured so as to be located at the position separated farther away from the fixed portion 21A than the abutting portion 21D in the direction along the plane of the back metal 10 of the friction pad 9, that is, in the disc rotating direction.

With the aforementioned configuration, even when the lining 11 of the friction pad 9 is worn away and the return spring 21 is deformed with the wear as exemplarily illustrated in FIG. 8 through repetition of the braking operation, a shift of the position of abutment of the abutting portion 21D of the return spring 21 against the carrier 2 side, that is, against the seating-surface plate portion 20 side of the pad spring 14 can be reduced as indicated by dimension a in FIG. 8. In addition, a direction of the shift can be set to a direction in which the position moves closer to the fixed portion 21A of the return spring 21, that is, moves closer to the back metal 10. Therefore, the moving distance of the abutting portion 21D of the return spring 21 with respect to the seating-surface plate portion 20 of the pad spring 14 becomes small. Therefore, the seating-surface plate portion 20 can be shortened. Correspondingly, a corresponding portion of the seating-surface plate portion 20 of the carrier 2 is not required to be provided. Thus, the carrier 2 and in turn, the disc brake can be reduced in size.

Moreover, the amount of projection (dimension γ illustrated in FIG. 8) of the extending portion 21B and the turned-back portion 21C of the return spring 21 in the axial direction of the disc 1 can be relatively reduced by the turned-back portion 21C. Therefore, a space for mounting the return spring 21 can be easily ensured between the carrier 2 and the friction pad 9, thereby enhancing the degree of freedom in layout design.

Figure 9:
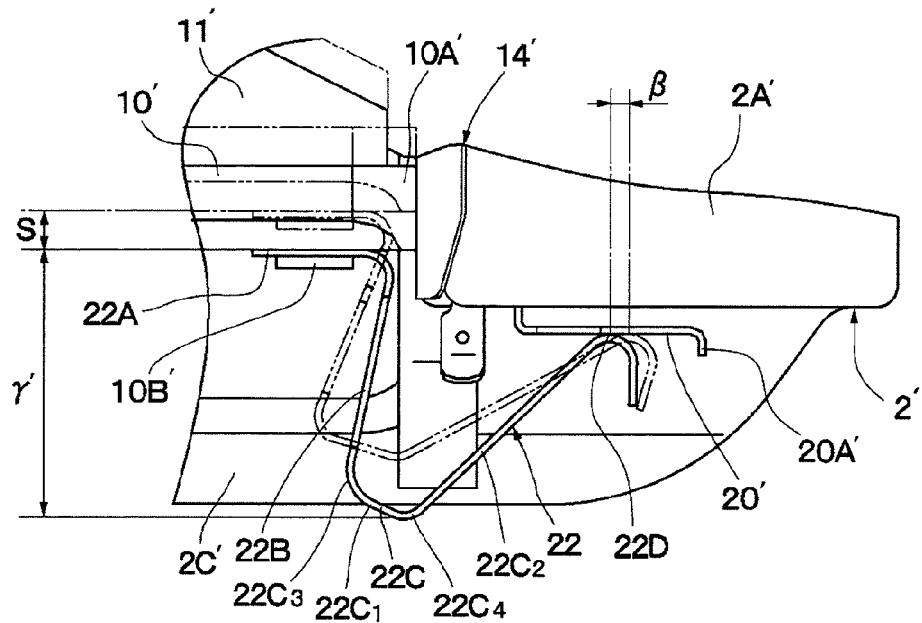
FIG. 9 is an enlarged view of a principal part at the same position as that illustrated in FIG. 8, illustrating the state of elastic deformation of a return spring of a comparative example.

On the other hand, in the case of a comparative example illustrated in FIG. 9, a return spring 22 includes a fixed portion 22A on one side, which is fixedly mounted to the back metal 10 of the friction pad 9, an extending portion 22B extending from the fixed portion 22A in the axial direction of the disc and in the direction away from the friction pad 9, a turned-back portion 22C formed by turning back the distal end side of the extending portion 22B toward the carrier 2, and an abutting portion 22D provided on the distal end side of the turned-back portion 22C so as to be elastically brought into abutment against the carrier 2 side (seating-surface plate portion 20 of the pad spring 14). The turned-back portion 22C includes a first extension portion 22C1 extending from the distal end side of the extending portion 22B in the direction along the plane of the friction pad 9' (back metal 10') and in the direction away from the fixed portion 22A, and a second extension portion 22C2 bent from the distal end side of the first extension portion 22C1 toward the carrier 2' side (seating-surface plate portion 20' side of a pad spring 14') so as to be smoothly connected to the abutting portion 22D. The turned-back portion 22C includes a first bent portion 22C3 formed between the extending portion 22B and the first extension portion 22C1 of the turned-back portion 22C, and a second bent portion 22C4 formed between the first extension portion 22C1 and the second extension portion 22C2, corresponding to a middle portion of the turned-back portion 22C. The second bent portion 22C4 is located at a position closer to the fixed portion 22A than the abutting portion 22D in the direction along the plane of the friction pad 9 (back metal 10). Specifically, an angle formed between the first extension portion 22C1 and the second extension portion 22C2 (hereinafter, referred to as "angle of the second bent portion 22C4" for convenience) is obtuse and is larger than a right angle corresponding to an angle formed between the extending portion 22B and the first extension portion 22C1 (hereinafter, referred to as "angle of the first bent portion 22C3" for convenience).

Specifically, the return spring 22 of the comparative example is configured by bending the middle portion (for example, the turned-back portion 22C) between the fixed portion 22A on one side in the length direction and the abutting portion 22D on the other side, which is brought into abutment against (elastic contact with) the seating-surface plate portion 20 on the arm portion 2A side of the carrier 2, into an inverted V-shape or inverted U-shape. Therefore, in the case of the return spring 22 according to the comparative example, when the lining 11 of the friction pad 9 is gradually worn away through repetition of the braking operation, the deformation of the return spring 22 becomes large with the wear. As a result, the position of abutment of the return spring 22 (abutting portion 22D) against the seating-surface plate portion 20 of the pad spring 14 is greatly shifted in a direction away from the fixed portion 22A, that is, in a direction away from the friction pad 9 as indicated by dimension β (β>α) illustrated in FIG. 9.

In addition, in the case of the comparative example illustrated in FIG. 9, a length dimension for ensuring a spring constant of the return spring 22 is required. Therefore, the amount of projection of the extending portion 22B and the turned-back portion 22C from the position of the fixed portion 22A in the axial direction of the disc (dimension γ' illustrated in FIG. 9) is inevitably required to be increased. As a result, layout design becomes difficult for ensuring the space for mounting the return spring 22.

Figure 10:
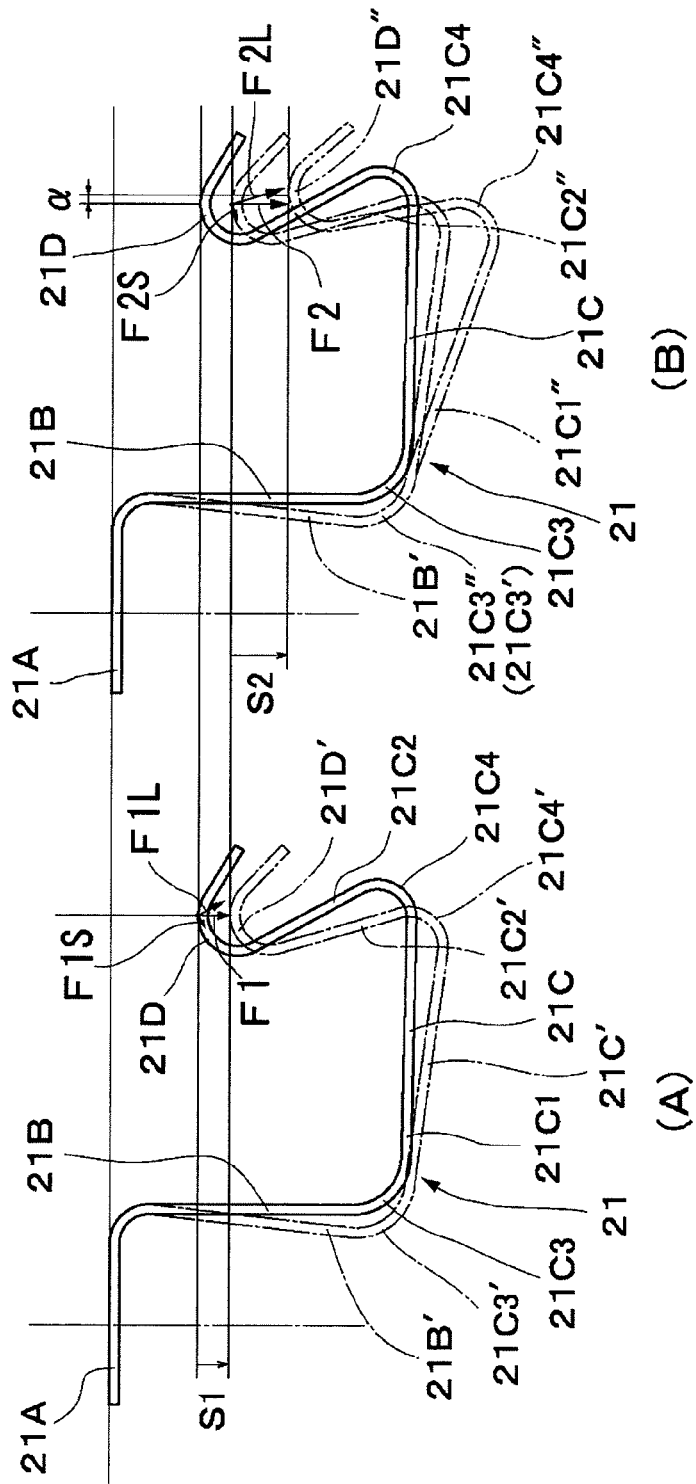
FIG. 10 is a diagram illustrating a state of deformation of the return spring illustrated in FIG. 2.
Figure 11:
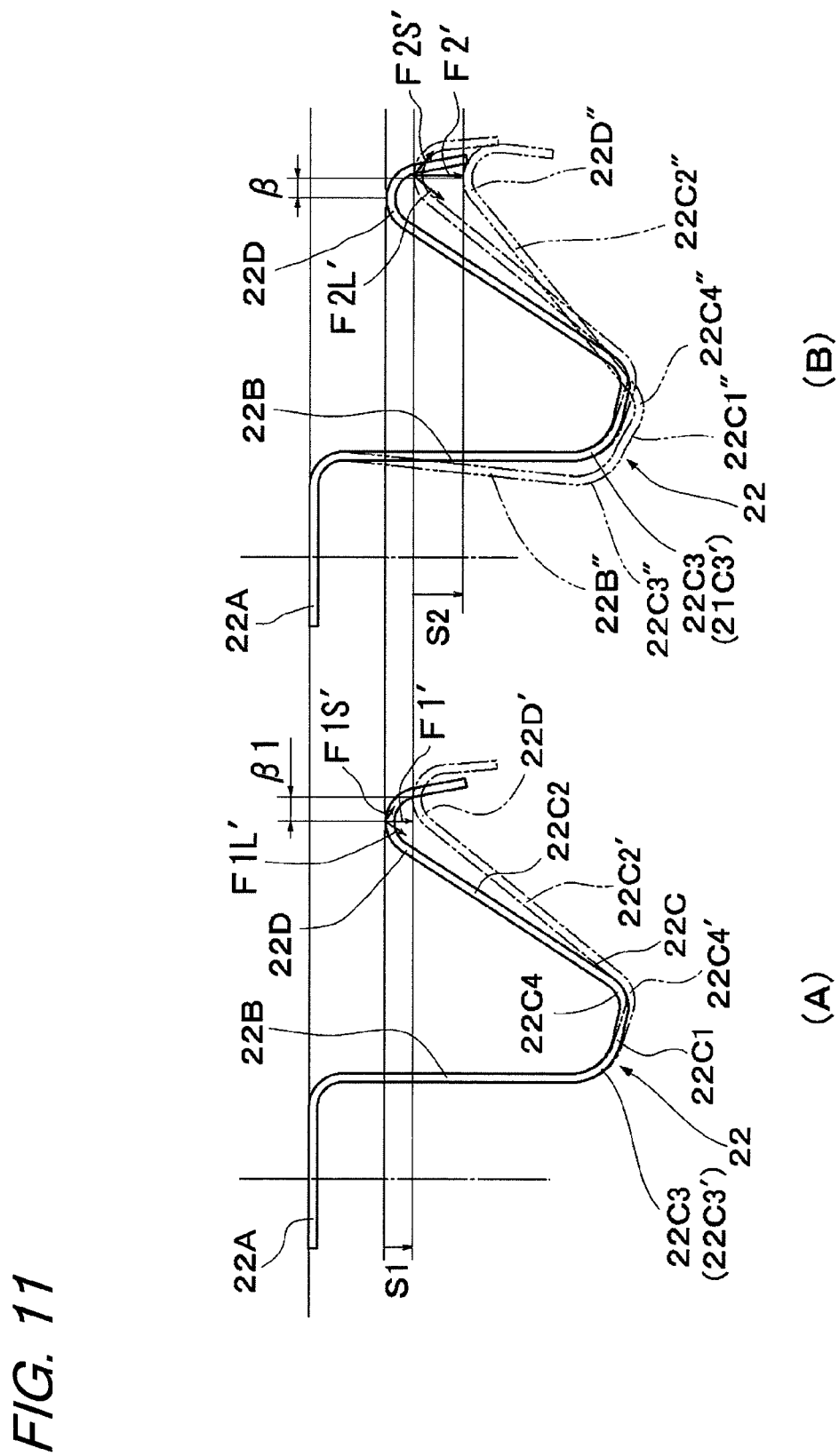
FIG. 11 is a diagram illustrating a state of deformation of the return spring of the comparative example.

Operations of the return spring 21 according to this embodiment and the return spring 22 according to the comparative example are described in detail referring to FIGS. 10 and 11. The fixed portion 21A of the return spring 21 and the fixed portion 22A of the return spring 22 move in the disc axial direction. In FIGS. 10 and 11, however, the abutting portions 21D and 22D are described as moving in the disc axial direction to exert a force, for convenience of the description.

In the case of the return spring 21 of this embodiment, when the movement of the abutting portion 21D as illustrated in FIG. 10(A) is a length S1 in an initial state in which the return spring 21 is subjected to a force, a force F1 vertical to the seating-surface plate portion 20 corresponding to an abutting surface acts on the abutting portion 21D of the return spring 21. The force F1 is divided into a component force F1L parallel to the second extension portion 21C2 and a component force F1S vertical to the second extension portion 21C2, which are then transmitted to the second extension portion 21C2. Then, the second extension portion 21C2 is formed by turning back a distal end side of the first extension portion 21C1 (at the position of the turned-back portion 21C4) in a direction along the plane of the back metal 10, that is, the disc rotating direction in a direction closer to the fixed portion 21A. Therefore, the component force F1S acting on the second extension portion 21C2 is going to deflect the second extension portion 21C2 in a direction along the plane of the back metal 10 and a direction closer to the fixed portion 21A. At this time, the fixed portion 21A is immobile. Therefore, the component force F1S deflects the extending portion 21B in a direction closer to the fixed portion 21A, that is, toward the side opposite to the abutting portion 21D in the disc rotating direction. By the deflection of the extending portion 21B, the abutting portion 21D does not move. The second bent portion 21C4 reaches a second bent portion 21C4' with a smaller amount of movement than the length S1 by the deflection of the second extension portion 21C2 and the extending portion 21B.

Further, when the lining 11 of the friction pad 9 is abnormally worn away to exert a force on the return spring 21 to move the abutting portion 21D over a longer length S2 as illustrated in FIG. 10(B), the deflection of the extending portion 21B reaches an upper limit. Therefore, a component force F2L of a force F2 acting on the second extension portion 21C2, which is parallel to a second extension portion 21C2', deflects the second extension portion 21C2 in a direction away from the first extension portion 21C1 (in which the angle of the second bent portion 21C4 increases). As a result, the abutting portion 21D moves by α' in the direction along the plane of the back metal 10 and in the direction away from the fixed portion 21A.

On the other hand, in the case of the return spring 22 of the comparative example, when the movement of the abutting portion 22D is the length S1 as illustrated in FIG. 11(A) in an initial stage in which the return spring 22 is subjected to the force, a force F1' vertical to the seating-surface plate portion 20' corresponding to the abutting surface acts on the abutting portion 22D of the return spring 22. The force F1' is divided into a component force F1L' parallel to the second extension portion 22C2 and a component force F1S' vertical to the second extension portion 22C2, which are then transmitted to the second extension portion 22C2. The second extension portion 22C2 is formed so as to be bent from the distal end side of the first extension portion 22C1 (at the position of the second bent portion 22C4) in the direction along the plane of the back metal 10, that is, the disc rotating direction and in the direction away from the fixed portion 22A. Therefore, the component force F1S' acts on the second extension portion 22C2 in the direction away from the fixed portion 22A to deflect the second extension portion 22C2 in the direction along the plane of the back metal 10, that is, the disc rotating direction and in the direction away from the fixed portion 22A. By the deflection of the second extension portion 22C2, the abutting portion 22D slides on the seating-surface plate portion 20' to move in the direction along the plane of the back metal 10 and in the direction away from the fixed portion 22A by a length β1. At this time, the deflection of the second extension portion 22C2 allows the second bent portion 22C4 to reach a second bent portion 22C4' with the amount of movement smaller than the length S1.

Further, when the return spring 22 is subjected to the force so that the abutting portion 22D moves farther by a length S2 as illustrated in FIG. 11(B), because the deflection of the second extension portion 22C2 has reached the upper limit, at this time, the extending portion 22B is deflected in a direction closer to the fixed portion 22A by a component force F2L'. By the deflection of the extending portion 22B, the position of the abutting portion 22D does not change. As described above, the abutting portion 22D moves in the direction along the plane of the back metal 10 and the direction away from the fixed portion 22A by β.

As described above, in comparison between the return spring 21 according to this embodiment and the return spring 22 according to the comparative example, the amount of movement of the abutting portion 21D in the disc rotating direction, caused by the movement of the fixed portion 21A, and the amount of movement of the abutting portion 22D in the disc rotating direction, caused by the movement of the fixed portion 22A, differ from each other, that is, the amount of movement of the abutting portion 21D is smaller than the amount of movement of the abutting portion 22D due to a difference in extending direction between the second extension portions 21C2 and 22C2.

The operations of the return spring 21 according to this embodiment and the return spring 22 according to the comparative example described above are now described from a different point of view. In the case of the return spring 21 according to this embodiment, the angle of the second bent portion 21C4 is acute and is smaller than the acute angle of the first bent portion 21C3. Therefore, when the fixed portion 21A moves with respect to the abutting portion 21D in the direction closer to the disc 1, the angle of the first bent portion 21C3 is more likely to be enlarged than that of the second bent portion 21C4. In other words, a bending stiffness of the first bent portion 21C3 is lower than that of the second bent portion 21C4. Specifically, when the friction pad 9 moves in the direction closer to the disc 1 to bend the second bent portion 21C4 so as to enlarge the angle thereof, the first bent portion 21C3 is subjected to the force to be bent so as to enlarge the angle thereof earlier than the second bent portion 21C4. As a result, the distal end of the extending portion 21B is deflected to the side opposite to the abutting portion 21D in the disc rotating direction. Therefore, for the return spring 21, the abutting portion 21D is scarcely moved in the disc rotating direction by the movement of the fixed portion 21A.

On the other hand, in the case of the return spring 22 of the comparative example, the angle of the second bent portion 22C4 is obtuse and is larger than the right angle corresponding to the angle of the first bent portion 22C3. Therefore, when the fixed portion 22A moves with respect to the abutting portion 22D in the direction closer to the disc 1, the angle of the second bent portion 22C4 is more likely to be enlarged than that of the first bent portion 22C3. In other words, a bending stiffness of the first bent portion 22C3 is higher than that of the second bent portion 22C4. Specifically, when the friction pad 9 moves in the direction closer to the disc 1 so that the second bent portion 22C4 is bent so as to enlarge the angle thereof, the second bent portion 22C4 is directly bent so as to increase the angle. As a result, the extending portion 22B cannot be deflected in the direction closer to the fixed portion 22A, that is, toward the side opposite to the abutting portion 22D in the disc rotating direction. Ultimately, the abutting portion 22D moves in the disc rotating direction and in the direction away from the fixed portion 22A.

As described above, the lower bending stiffness of the first bent portion 21C3 of the return spring 21 than that of the second bent portion 21C4 can suppress the amount of movement of the abutting portion 21D in the disc rotating direction, caused by the movement of the fixed portion 21A.

As described above, the return spring 21 used in this embodiment adopts the configuration as described above. As a result, even when the lining 11 of the friction pad 9 is worn away by the repeated braking operations, the positional shift of the position of abutment of the return spring 21 (abutting portion 21D) against the seating-surface plate portion 20 of the pad spring 14 can be reduced as indicated by the dimension a illustrated in FIG. 8.

As a result, the length dimension of the seating-surface plate portion 20 of the pad spring 14 can be shortened. Therefore, a corresponding portion of the seating-surface plate portion 20 of the carrier 2 is not required to be provided correspondingly. Thus, the carrier 2, and in turn, the disc brake can be reduced in size. Moreover, a stock layout of the pad spring 14 can be efficiently determined. Further, even when a layout of the pad guide 4 and the pin hole (not shown) on the arm portion 2A side of the carrier 2 is strict, the layout can be relatively easily performed.

Further, the amount of projection (dimension γ illustrated in FIG. 8) of the return spring 21 can be relatively made small by the turned-back portion 21C having the middle portion (second bent portion 21C4) located at the position separated farther away from the fixed portion 21A than the abutting portion 21D in the direction along the plane of the back metal 10 (disc rotating direction). Therefore, a space for mounting the return spring 21 can be easily ensured to enhance the degree of freedom in layout design.

Further, the turned-back portion 21C of the return spring 21 includes the second bent portion 21C4 between the first extension portion 21C1 and the second extension portion 21C2, which is located at the position separated farther away from the fixed portion 21A than the abutting portion 21D in the direction along the plane of the back metal 10, that is, in the disc rotating direction, or the first extension portion 21C1 extends from the distal end side of the extending portion 21B in the direction along the plane of the friction pad 9, that is, in the disc rotating direction and the direction away from the fixed portion 21A to the position beyond the abutting portion 21D. Therefore, a length of extension (total length dimension) of the first extension portion 21C1 and the second extension portion 21C2 can be formed longer than that of a conventional product (comparative example illustrated in FIG. 9). In this case, the spring constant can be easily ensured.

Specifically, for the return spring 21, by appropriately selecting the length of extension of the first extension portion 21C1 and the second extension portion 21C1, the spring constant can be easily adjusted to increase the degree of freedom in design. Moreover, a yield rate in fabrication of the return spring 21 can be improved to easily ensure a necessary strength.

Moreover, in the case of the return spring 21 including the extending portion 21B and the turned-back portion 21C, the biasing force of the return spring 21 can be applied on the friction pad 9 at an appropriate position when, for example, the braking operation of the vehicle is released or the like. Therefore, the friction pad 9 can be stably returned while keeping a posture parallel to the surface of the disc 1.

Therefore, according to this embodiment, the disc brake can be reduced in size. In addition, the degree of freedom in layout design can be enhanced. Moreover, the friction pad 9 can be smoothly returned to the standby position by the biasing force of the return spring 21 when the braking operation is released. Therefore, the return operation of the friction pad 9 can be stabilized. As a result, uneven wear of the friction pad 9 or the like can be reduced. As a result, a drag of the pad and a brake squeal can be prevented.

Second Embodiment

Figure 12:
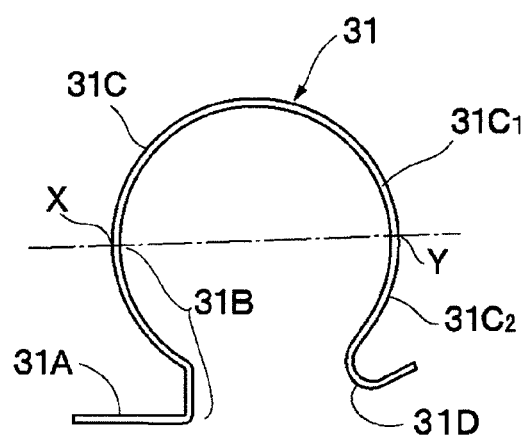
FIG. 12 is a component drawing illustrating a return spring according to a second embodiment.

Next, FIG. 12 illustrates a second embodiment of the present invention. This embodiment is characterized in a configuration in which a turned-back portion of a return spring is formed so as to be curved from a distal end side of the extending portion in an arc-like shape and a middle portion thereof is located at a position separated farther away from a fixed portion than an abutting portion in the direction along the plane of the friction pad. The same components as those of the first embodiment described above are denoted by the same reference numerals in the second embodiment, and the description thereof is omitted.

In the drawing, the reference numeral 31 denotes a return spring for biasing the friction pad 9 in a return direction in which the friction pad 9 is moved away from the disc 1. The return spring 31 is configured approximately in the same manner as the return spring 21 described in the first embodiment, and includes a flat-plate like fixed portion 31A located on one side in a length direction thereof, an extending portion 31B formed by bending into an L shape from the fixed portion 31A so that a distal end side extends in the axial direction of the disc, a turned-back portion 31C formed by bending a distal end side of the extending portion 31B so as to be turned back in a C shape toward the carrier 2, and an abutting portion 31D formed by bending the other side of the return spring 31 in the length direction in an approximate U shape.

However, the return spring 31 in this case differs from that of the first embodiment in that the extending portion 31B is bent from the fixed portion 31A into the L shape to extend parallel to the disc axial direction and then is slightly bent toward the side opposite to the abutting portion 31D to extend in the disc axial direction (extend to a position X illustrated in FIG. 12 at which an alternate long and short dash line crosses) and in that the turned-back portion 31C is formed so as to be curved from the distal end side of the extending portion 31B in an arc-like shape to form a C shape. A base end side of the turned-back portion 31C is formed as an arc continuous from the distal end of the extending portion 31B. The turned-back portion 31C forms, for example, an approximate C-like whole shape. The turned-back portion 31C forming the arc-like shape has a configuration in which a middle portion 31C1 is located at a position farther away from the fixed portion 31A than the abutting portion 31D in the direction along the plane of the friction pad 9.

As described above, even in the second embodiment configured as described above, substantially the same functions and effects as those of the first embodiment described above can be obtained. In particular, the return spring 31 in this case is formed in an approximate shape as a whole and has a configuration in which the turned-back portion 31C is formed to be curved into the C shape (arc-like shape) as the arc continuous from the distal end side of the extending portion 31B.

Therefore, for the return spring 31, the spring constant can be easily adjusted to enhance the degree of freedom in design by appropriately selecting a radius of the arc (curvature) or a length of extension of the turned-back portion 31C. Moreover, a yield rate in fabrication of the return spring 31 can be improved to easily ensure a necessary strength.

The turned-back portion 31C is formed as a continuous arc as compared with the straight first extension portion 21C1 and second extension portion 21C2 described with the first embodiment. If the turned-back portion is to be forcibly divided into a first extension portion 31C1 and a second extension portion 31C2, the extension portions are separated at a position Y crossing an alternate long and short dash line illustrated in FIG. 12. In the second embodiment described above, the whole shape of the return spring 31 is the arc-like approximate Ω shape. However, a part thereof, for example, the extending portion 31B may be extended to form an approximate P shape.

Third Embodiment

Figure 13:
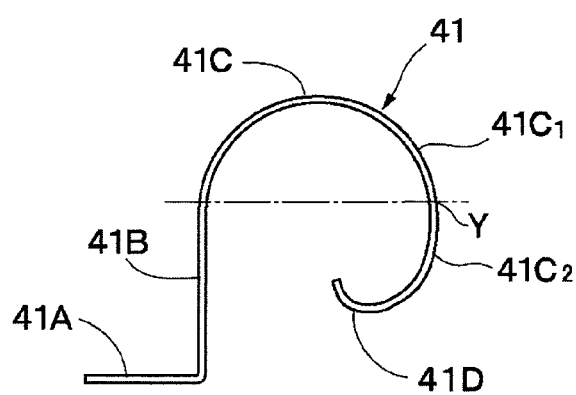
FIG. 13 is a component drawing illustrating a return spring according to a third embodiment.

Next, FIG. 13 illustrates a third embodiment of the present invention. Even in the third embodiment, the same components as those of the first embodiment described above are denoted by the same reference numerals, and the description thereof is omitted. This embodiment is characterized in a configuration in which an abutting portion 41D described below is oriented in an inward direction of an arc formed by a turned-back portion 41C.

In the drawing, the reference numeral 41 denotes a return spring for biasing the friction pad 9 in a return direction away from the disc 1. The return spring 41 includes a fixed portion 41A, an extending portion 41B, a turned-back portion 41C, and an abutting portion 41D. The turned-back portion 41C is configured to be curved into an arc-like shape from a distal end side of the extending portion 41B extending in an axial direction of the disc 2 along a tangent direction.

However, the return spring 41 in this case differs from those of the first and second embodiments in that the abutting portion 41D located on the other side of the return spring 41 in the length direction is bent in an inward direction of the arc formed by the turned-back portion 41C into an approximate U shape so as to be curved into the arc-like shape. The turned-back portion 41C forming the arc-like shape has a configuration in which a middle portion 41C1 thereof is located at a position farther away from the fixed portion 41A than the abutting portion 41D in the direction along the plane of the friction pad 9. If the turned-back portion 41C is to be forcibly divided into a first extension portion 41C1 and a second extension portion 41C2, the extension portions are separated at a position Y illustrated in FIG. 13, at which an alternate long and short dash line crosses.

As described above, even in the third embodiment configured as described above, substantially the same functions and effects as those of the first and second embodiments described above can be obtained. In this case, the abutting portion 41D is bent into the approximate U shape in the inward direction of the arc formed by the turned-back portion 41C. As a result, the distal end of the abutting portion 41D does not come into contact with another component or the like during the fabrication of the disc brake, thereby improving fabrication efficiency.

Fourth Embodiment

Figure 14:
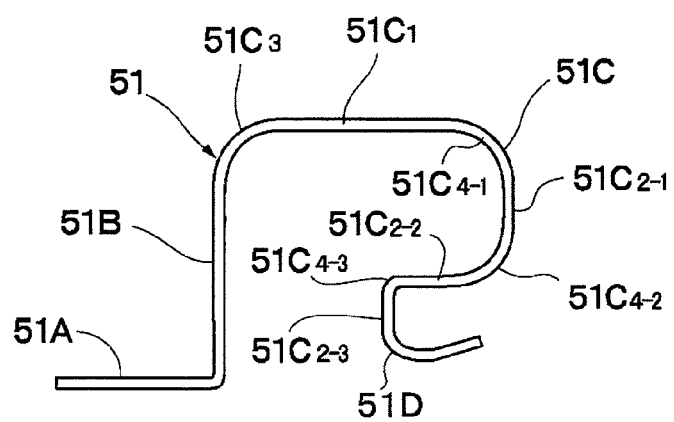
FIG. 14 is a component drawing illustrating a return spring according to a fourth embodiment.

Next, FIG. 14 illustrates a fourth embodiment of the present invention. This embodiment is characterized in a configuration in which a turned-back portion of a return spring is formed by first to fourth extension portions described below and a middle portion thereof is located at a position farther away from a fixed portion than an abutting portion in the direction along the plane of the friction pad. The same components as those of the first embodiment described above are denoted by the same reference numerals in the fourth embodiment, and the description thereof is omitted.

In the drawing, the reference numeral 51 denotes a return spring for biasing the friction pad 9 in a return direction in which the friction pad 9 is moved away from the disc 1. The return spring 51 is configured approximately in the same manner as the return spring 21 described in the first embodiment, and includes a flat-plate like fixed portion 51A located on one side in a length direction thereof, an extending portion 51B formed by bending into an L shape from the fixed portion 51A so that a distal end side extends in the axial direction of the disc, a turned-back portion 51C formed by bending a distal end side of the extending portion 51B a plurality of times toward the carrier 2, and an abutting portion 51D formed by bending the other side of the return spring 51 in the length direction in an approximate U shape or an arc-like shape.

However, the turned-back portion 51C of the return spring 51 includes a first extension portion 51C1 extending from the distal end side of the extending portion 51B in the direction along the plane of the friction pad 9 (back metal 10) and in the direction away from the fixed portion 51A, a second extension portion 51C2-1 turned back from a distal end side of the first extension portion 51C1 toward the carrier 2 (seating-surface plate portion 20 side of the pad spring 14) in an approximate L shape to extend approximately parallel to the extending portion 51B, a third extension portion 51C2-2 turned back from a distal end side of the second extension portion 51C2-1 in an approximate L shape to extend approximately parallel to the first extension portion 51C1, and a fourth extension portion 51C2-3 turned back from a distal end side of the third extension portion 51C2-2 in an approximate L shape to extend approximately parallel to the extending portion 51B.

The abutting portion 51D of the return spring 51 is formed by bending a distal end side of the fourth extension portion 51C2-3 in an approximate U shape or an arc-like shape. A first bent portion 51C3 is provided between the extending portion 51B and the first extension portion 51C1. In a middle portion of the turned-back portion 51C, a second bent portion 51C4-1 is provided so as to be located between the first extension portion 51C1 and the second extension portion 51C2-1. A third bent portion 51C4-2 is provided between the second extension portion 51C2-1 and the third extension portion 51C2-2. Further, a fourth bent portion 51C4-3 is provided between the third extension portion 51C2-2 and the fourth extension portion 51C2-3. The second extension portion 51C2-1, the third extension portion 51C2-2, and the fourth extension portion 51C2-3 correspond to the second extension portion 21C2 in the first embodiment.

The second bent portion 51C4-1 corresponding to the middle portion of the turned-back portion 51C, the second extension portion 51C2-1, the third bent portion 51C4-2 and the like are located at the positions separated farther away from the fixed portion 51A than the abutting portion 51D in the direction along the plane of the friction pad 9 (back metal 10) (disc rotating direction).

As described above, even in the fourth embodiment configured as described above, substantially the same functions and effects as those of the first embodiment described above can be obtained. Even in this case, because the turned-back portion 51C of the return spring 51 is composed of the first extension portion 51C1, the second extension portion 51C2-1, the third extension portion 51C2-2, the fourth extension portion 51C2-3, and the like, the spring constant can be easily adjusted to enhance the degree of freedom in design.

Fifth Embodiment

Figure 15:
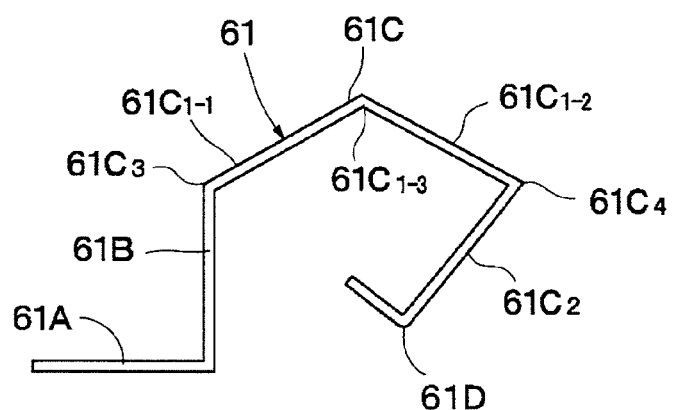
FIG. 15 is a component drawing illustrating a return spring according to a fifth embodiment.

Next, FIG. 15 illustrates a fifth embodiment of the present invention. This embodiment is characterized in a configuration in which a turned-back portion of a return spring is formed by first to third extension portions described below and a middle portion thereof is located at a position separated farther away from a fixed portion than an abutting portion in the direction along the plane of the friction pad (disc rotating direction). The same components as those of the first embodiment described above are denoted by the same reference numerals in the fifth embodiment, and the description thereof is omitted.

In the drawing, the reference numeral 61 denotes a return spring for biasing the friction pad 9 in a return direction in which the friction pad 9 is moved away from the disc 1. The return spring 61 is configured approximately in the same manner as the return spring 21 described in the first embodiment, and includes a fixed portion 61A, an extending portion 61B, a turned-back portion 61C formed by bending a distal end side of the extending portion 61B a plurality of times toward the carrier 2, and an abutting portion 61D formed by bending the other side of the return spring 61 in the length direction.

However, the turned-back portion 61C of the return spring 61 includes a first extension portion 61C1-1 and a second extension portion 61C1-2 extending from the distal end side of the extending portion 61B in the direction along the plane of the friction pad 9 (back metal 10) (disc rotating direction) and in the direction away from the fixed portion 61A, and a third extension portion 61C1-2 turned back from a distal end side of the second extension portion 61C1-2 toward the carrier 2 (seating-surface plate portion 20 side of the pad spring 14) to connect to the abutting portion 61D. The first extension portion 61C1-1 and the second extension portion 61C1-2 correspond to the first extension portion 21C1 in the first embodiment.

The turned-back portion 61C of the return spring 61 includes a first bent portion 61C3 provided between the extending portion 61B and the first extension portion 61C1-1, a second bent portion 61C4 provided between the second extension portion 61C1-2 and the third extension portion 61C2 so as to be bent in an approximate L shape, and a third bent portion 61C1-3 provided between the first extension portion 61C1-1 and the second extension portion 61C1-2 so as to be bent to form an obtuse angle. The second bent portion 61C4 corresponding to the middle portion of the turned-back portion 61C is located at the position separated farther away from the fixed portion 61A than the abutting portion 61D in the direction along the plane of the friction pad 9 (back metal 10).

As described above, even in the fifth embodiment configured as described above, substantially the same functions and effects as those of the first embodiment described above can be obtained. Even in this case, because the turned-back portion 61C of the return spring 61 is composed of the first extension portion 61C1-1, the second extension portion 61C1-2, the third extension portion 61C2, and the like, the spring constant can be easily adjusted to enhance the degree of freedom in design.

Sixth Embodiment

Figure 16:
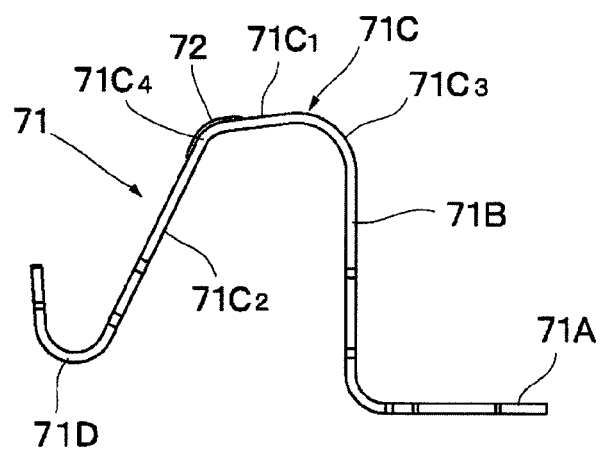
FIG. 16 is a component drawing illustrating a return spring according to a sixth embodiment.
Figure 17:
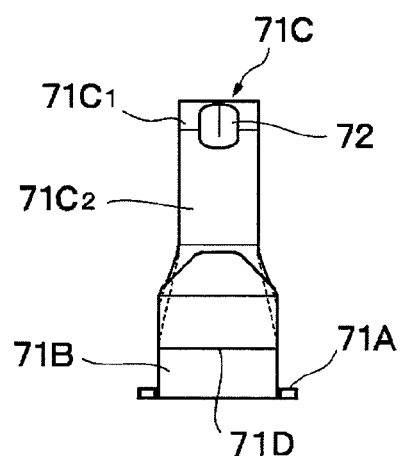
FIG. 17 is a left side view illustrating the return spring illustrated in FIG. 16, as viewed from the left direction.
Figure 18:
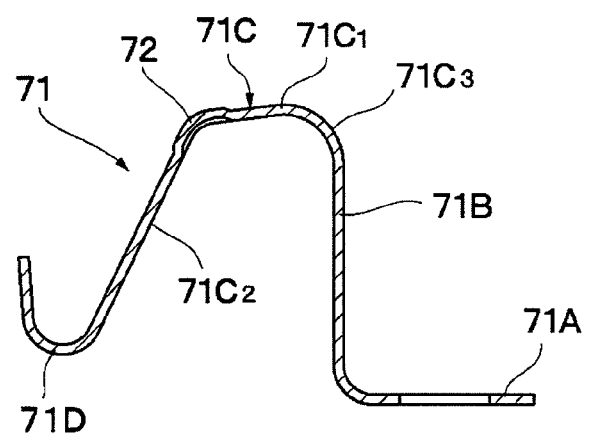
FIG. 18 is a sectional view illustrating the return spring illustrated in FIG. 16.

Next, FIGS. 16 to 18 illustrate a sixth embodiment of the present invention. This embodiment is characterized in that a rib 72 is provided so as to increase a bending stiffness of a second bent portion 71C4. In the embodiments described above, in particular, in the first embodiment, the angle of the second bent portion 21C4 is set smaller than that of the first bent portion 21C3 so as to set the bending stiffness of the first bent portion 21C3 lower than that of the second bent portion 21C4. On the other hand, in this sixth embodiment, the bending stiffnesses of the bent portion 21C3 and the second bent portion 21C4 are set different from each other by thicknesses, width dimensions, shapes, and the like of the bent portion 21C3 and the second bent portion 21C4 other than by an angle formed thereby. In the sixth embodiment, the components other than the springs are the same as those in the first embodiment described above, and the detailed description thereof is omitted.

The return spring 71 includes a fixed portion 71A on one side, which is fixedly mounted to the back metal 10 of the friction pad 9, an extending portion 71B extending from the fixed portion 71A in the disc axial direction and in the direction away from the friction pad 9, a turned-back portion 71C formed by turning back a distal end side of the extending portion 71B toward the carrier 2, and an abutting portion 71D provided on the distal end side of the turned-back portion 71C to be elastically brought into abutment against on the carrier 2 side (seating-surface plate portion 20 side of the pad spring 14).

The turned-back portion 71C includes a first extension portion 71C1 extending from a distal end side of the extending portion 71B in the direction along the plane of the friction pad 9 (back metal 10) (disc rotating direction) and in the direction away from the fixed portion 71A, and a second extension portion 71C2 bent from a distal end side of the first extension portion 71C1 toward the carrier 2 (the seating-surface plate portion 20 side of the pad spring 14) so as to be smoothly connected to the abutting portion 71D.

The turned-back portion 71C includes a first bent portion 71C3 formed between the extending portion 71B and the first extension portion 71C1 of the turned-back portion 71C, and a second bent portion 71C4 formed between the first extension portion 71C1 and the second extension portion 71C2, which corresponds to a middle portion of the turned-back portion 71C. The second bent portion 71C4 is located at a position closer to the fixed portion 71A than the abutting portion 71D in the direction along the plane of the friction pad 9 (back metal 10), that is, in the disc rotating direction. Specifically, an angle formed by the first extension portion 71C1 and the second extension portion 71C2 (hereinafter, referred to as "angle of the second bent portion 71C4" for convenience) is obtuse and is larger than a right angle corresponding to an angle formed by the extending portion 71B and the first extension portion 71C1 (hereinafter, referred to as "angle of the first bent portion 71C3" for convenience). Hence, the return spring 71 has the same whole shape as that of the return spring 22 illustrated in FIG. 9, corresponding to the comparative example described in the first embodiment.

The rib 72, which projects in a direction to form convexity by bending, is provided to the second bent portion 71C4. By the rib 72, a bending stiffness of the second bent portion 71C4 becomes higher than that of the first bent portion 71C3. Therefore, when the fixed portion 71A moves with respect to the abutting portion 71D in the direction closer to the disc 1, the angle of the first bent portion 71C3 is enlarged earlier than the angle of the second bent portion 71C4.

As a result, a positional shift of the position of abutment of the abutting portion 71D of the return spring 71 against the seating-surface plate portion 20 of the pad spring 14 can be reduced to be small. Moreover, the length dimension of the seating-surface plate portion 20 of the pad spring 14 can be reduced. Therefore, a corresponding portion of the seating-surface plate portion 20 of the carrier 2 is not required to be provided correspondingly. Thus, the carrier 2, and in turn, the disc brake can be reduced in size. Further, a stock layout of the pad spring 14 can be efficiently determined. Further, even in the case where a layout of the pad guide 4 and the pin hole (not shown) on the arm portion 2A side of the carrier 2 is strict, the layout can be relatively easily performed.

In the first embodiment described above, the case where the abutting portion 21D of the return spring 21 is elastically brought into abutment against the seating-surface plate portion 20 of the pad spring 14 has been described as an example. However, the present invention is not limited thereto. For example, there may be used a configuration in which a seating-surface plate portion formed from a member different from the pad spring is fixedly provided to the mounting member (carrier) so that the abutting portion 21D of the return spring 21 is brought into abutment against the seating-surface plate portion. Moreover, there may be used a configuration in which, without using the seating-surface plate portion 20 or the like, the abutting portion of the return spring is directly brought into abutment against an end surface of the mounting member (or a seating-surface portion for the return spring, which is provided to the mounting member) or the like. This point can be similarly applied to the second to sixth embodiments.

Further, in the first embodiment described above, there has been described as an example the case where the pad guide 4 forming the concave shape is provided to the arm-portion 2A of the carrier 2 and each of the ear portions 10A of the back metal 10, corresponding to the fitting portions into the pad guides 4, is formed to have the convex shape. However, the present invention is not limited thereto. For example, there may be used a configuration in which a fitting portion having a concave shape is provided to the back metal of the friction pad and a pad guide having a convex shape is provided to the arm portion of the mounting member.

In the first embodiment described above, there has been described as an example the case where the base end side of the return spring 21 is caulked to the ear portion 10A side, which is located on the rotating entrance side of the disc 1, among the right and left ear portions 10A of the back metal 10. However, the present invention is not limited thereto. For example, there may be used a configuration in which the return springs are similarly provided on the rotating exit side of the disc 1.

In the first embodiment described above, there has been described as an example the case where the so-called integral type pad spring 14 including the flat plate portions 16, the guide plate portions 18, and the radial-direction biasing portions 19 respectively on the inner side and the outer side of the disc 1 is used. However, the present invention is not limited thereto. For example, there may be used a configuration in which two pad springs having shapes obtained by splitting the pad spring 14 into one on the inner side and the other one on the outer side of the disc 1 are respectively provided on the inner side and the outer side of the disc 1. This point can be similarly applied to the pad spring 14 located on the rotating exit side of the disc 1.

In the invention encompassed in the embodiments described above, the turned-back portion of the return spring includes the first extension portion extending from the distal end side of the extending portion in the direction along the plane of the friction pad and in the direction away from the fixed portion, and the second extension portion turned back from the distal end side of the first extension portion toward the mounting member so as to be connected to the abutting portion. The second extension portion is formed by being turned back from the distal end side of the first extension portion in the direction along the plane of the friction pad and in the direction closer to the fixed portion.

In this manner, the turned-back portion between the first extension portion and the second extension portion can be located at the position farther away from the fixed portion than the abutting portion in the direction along the plane of the friction pad. Thus, the length of extension (total length dimension) of the first extension portion and the second extension portion can be formed longer than that of a conventional product. Therefore, for the return spring, the spring constant can be easily adjusted to enhance the degree of freedom in design. Moreover, the yield rate in fabrication of the return spring can be improved to easily ensure the necessary strength.

In the invention encompassed in the one embodiment described above, the turned-back portion of the return spring is formed so as to be curved from the distal end side of the extending portion into the arc-like shape and to have the middle portion extending in the direction along the plane of the friction pad (disc rotating direction) to the position farther away from the fixed portion than the abutting portion.

As described above, the middle portion of the turned-back portion which is formed so as to be curved from the distal end side of the extending portion of the return spring into the arc-like shape is extended to the position farther away from the fixed portion than the abutting portion in the direction along the plane of the friction pad. As a result, the positional shift of the position of abutment of the return spring against the mounting member side can be reduced to be small even when the friction pads are worn away. Thus, the friction pads can be returned in a stable posture, while the space for mounting the return springs can be easily ensured.

According to the embodiments of the present invention described above, the disc brake can be reduced in size.

Although some exemplary embodiments of the invention of this application have been described above in detail, those skilled in the art can easily understand that various modifications can be made to the exemplary embodiments described above without substantially departing from the novel teachings and advantages of the invention of this application. Therefore, all the modifications are intended to be encompassed in the scope of the invention of this application.

The present application claims priority under the Paris convention on the basis of Japanese Patent Application No. 2009-222773 filed on Sep. 28, 2009 and Japanese Patent Application No. 2010-207292 filed on Sep. 15, 2010. The entire disclosure of Japanese Patent Application No. 2009-222773 filed on Sep. 28, 2009 and Japanese Patent Application No. 2010-207292 filed on Sep. 15, 2010 including specification, claims, drawings and summary is incorporated herein by reference.

REFERENCE SIGNS LIST 1 disc, 2 carrier (mounting member), 2A arm portion, 3 disc path portion, 4 pad guide, 5 caliper, sliding pin, 9 friction pad, 10 back metal, 10A ear portion (fitting portion), 10B caulking portion, lining, 14 pad spring, 18 guide plate portion, radial-direction biasing portion, 20 seating-surface plate portion, 21, 31, 41, 51, 61, 71 return spring, 21A, 31A, 41A, 51A, 61A, 71A fixed portion, 21B, 31B, 41B, 51B, 61B, 71B extending portion, 21C, 31C, 41C, 51C, 61C, 71C turned-back portion, 21C1, 31C1, 41C1, 51C1, 71C1 first extension portion (another extension portion), 21C2, 31C2, 41C2, 71C2 second extension portion (one extension portion), 51C2-1 second extension portion (one extension portion), 51C2-2 third extension portion (second extension portion, one extension portion), 51C2-3 fourth extension portion (second extension portion, one extension portion), 61C1-1 first extension portion (first extension portion, another extension portion), 61C1-2 second extension portion (first extension portion, another extension portion), 61C2 third extension portion (second extension portion, one extension portion), 21C3, 51C3, 61C3, 71C3 first bent portion (one bent portion), 21C4, 51C4-1, 61C4, 71C4 second bent portion (another bent portion), 51C4-2 third bent portion (another bent portion), 51C4-3 fourth bent portion (another bent portion), 61C1-3 third bent portion, 21D, 31D, 41D, 51D, 61D, 71D abutting portion

The invention claimed is:

1. A disc brake, comprising:
a mounting member formed so as to extend over an outer circumferential side of a disc in an axial direction, for slidably supporting at least a pair of friction pads provided on both surfaces of the disc;
a caliper slidably provided to the mounting member for pressing the pair of friction pads against the both surfaces of the disc; and
return springs provided between the mounting member and the pair of friction pads, for biasing the pair of friction pads in a return direction in which the pair of friction pads move away from the disc, wherein:
each of the return springs comprises: a fixed portion fixed to a corresponding one of the pair of friction pads; an abutting portion to be brought into abutment against a side of the mounting member; an extending portion extending from the fixed portion in a disc axial direction and a direction away from the corresponding one of the pair of friction pads; and a turned-back portion turned back from the extending portion toward the abutting portion; and
the turned-back portion comprises one extension portion extending, from a position separated farther away from the fixed portion than the abutting portion in a disc rotating direction, in the disc axial direction and a direction closer to the mounting member so as to be connected to the abutting portion, and wherein the turned-back portion of the return spring comprises at least two bent portions in a direction along disc abutting surfaces of the pair of friction pads; and a bending stiffness of one bent portion of the at least two bent portions, which is located on a side of the pair of friction pads, is set lower than a bending stiffness of another bent portion thereof located on a side of the mounting member.

2. A disc brake according to claim 1, wherein:

the turned-back portion of the return spring comprises another extension portion extending from a distal end side of the extending portion in a direction along planes of the pair of friction pads and in a direction away from the fixed portion to a position beyond the abutting portion; and the one extension portion is turned back from a distal end side of the another extension portion toward the mounting member in the disc axial direction, and in the disc rotating direction and in a direction closer to the fixed portion.

3. A disc brake according to claim 2, wherein the one extension portion is turned back so that an angle formed with another extension portion becomes acute.

4. A disc brake according to claim 1, wherein, when the pair of friction pads move in a direction closer to the disc so that the another bent portion is bent so as to increase an angle thereof, the extending portion is subjected to a force of bending to deflect a distal end of the extending portion toward a side opposite to the abutting portion in the disc rotating direction.

5. A disc brake according to claim 1, wherein:

each of the pair of friction pads includes ear portions fitted into the mounting member by concavity-convexity in the disc rotating direction; and the fixed portion of the return spring is caulked to one of the ear portions.

6. A disc brake according to claim 1, further comprising pad springs for guiding sliding movement of the pair of friction pads between the pair of friction pads and the mounting member in the disc rotating direction, wherein each of the pad springs comprises a seating-surface plate portion extending in the disc rotating direction, against which the abutting portion of a corresponding one of the return springs abuts.

7. A disc brake according to claim 1, wherein the return springs are located on a rotating entrance side in the disc rotating direction.

8. A disc brake, comprising:

a mounting member, formed so as to extend over an outer circumferential side of a disc in a disc axial direction, for slidably supporting at least a pair of friction pads provided on both surfaces of the disc;

a caliper slidably provided to the mounting member, for pressing the pair of friction pads against the both surfaces of the disc; and return springs provided between the mounting member and the pair of friction pads, for biasing the pair of friction pads in a return direction in which the pair of friction pads move away from the disc, wherein:

each of the return springs comprises:

a fixed portion provided on one end side, fixed onto a plane of a corresponding one of the pair of friction pads, on a side opposite to a disc abutting surface;

an abutting portion provided on another end side, to be brought into elastic abutment against a side of the mounting member;

an extending portion extending from the fixed portion in the disc axial direction and in a direction away from the corresponding one of the pair of friction pads; and a turned-back portion formed between a distal end side of the extending portion and the abutting portion, and turned back toward the mounting member; and the turned-back portion comprises:

a first extension portion extending from a distal end side of the extending portion in a direction along the planes of the pair of friction pads and in a direction away from the fixed portion to a position beyond the abutting portion; and a second extension portion obliquely turned back from a distal end side of the first extension portion toward the mounting member in the disc axial direction so as to be connected to the abutting portion; and wherein an angle formed between the first extension portion and the second extension portion is smaller than an angle formed between the extending portion and the first extension portion.

9. A disc brake according to claim 8, wherein a bending stiffness of a first bent portion provided between the extending portion and the first extension portion is set lower than a bending stiffness of a second bent portion provided between the first extension portion and the second extension portion.

10. A disc brake according to claim 8, wherein the first extension portion is turned back so that an angle formed with the second extension portion becomes acute.

11. A disc brake according to claim 8, wherein the first extension portion and the second extension portion are turned back so that an angle formed between the extending portion and the first extension portion and an angle formed between the first extension portion and the second extension portion become both acute.

12. A disc brake, comprising:

a mounting member, formed so as to extend over an outer circumferential side of a disc, for slidably supporting at least a pair of friction pads provided on both surfaces of the disc;

a caliper slidably provided to the mounting member, for pressing the pair of friction pads against the both surfaces of the disc; and return springs for biasing the pair of friction pads in a return direction in which the pair of friction pads move away from the disc, the return springs each comprising: a fixed portion fixed to a corresponding one of the pair of friction pads; an abutting portion to be brought into abutment against a side of the mounting member; an extending portion extending from the fixed portion in a disc axial direction and in a direction away from the corresponding one of the pair of friction pads; and a turned-back portion turned back from the extending portion toward the abutting portion, wherein:

the turned-back portion of the return spring comprises at least two bent portions formed in a direction along disc abutting surfaces of the pair of friction pads; and a bending stiffness of one bent portion of the at least two bent portions, which is on a side of the pair of friction pads, is set lower than a bending stiffness of another bent portion thereof on the side of the mounting member.

13. A disc brake according to claim 12, wherein each of the return springs comprises one extension portion extending from the another bent portion to the abutting portion with a predetermined angle with respect to a disc rotating direction.

14. A disc brake according to claim 13, wherein each of the return springs comprises another extension portion extending from the extending portion in the disc rotating direction so as to be connected to the another bent portion.

15. A disc brake according to claim 14, wherein the one extension portion is turned back from a distal end side of the another extension portion toward the mounting member in the disc axial direction, and in the disc rotating direction and a direction closer to the fixed portion.

16. A disc brake according to claim 12, wherein, when the pair of friction pads move in a direction closer to the disc to bend the another bent portion so as to increase an angle thereof, the extending portion is subjected to a force of bending so that a distal end of the extending portion is deflected toward a side opposite to the abutting portion in a disc rotating direction.

17. A disc brake according to claim 12, wherein the turned-back portion is turned back so that an angle formed by the one bent portion and an angle formed by the another bent portion become both acute.

* * * * *